Oct. 5, 1926.
W. H. MORGAN
METAL WHEEL
Filed May 5, 1922
1,601,764
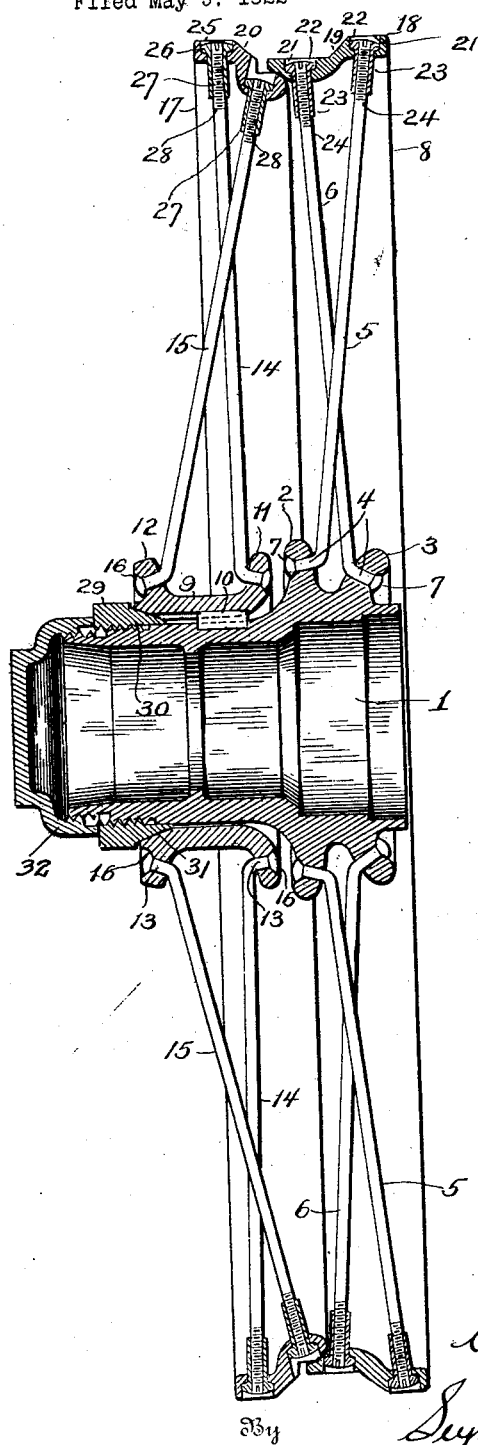

Patented Oct. 5, 1926.

1,601,764

UNITED STATES PATENT OFFICE.

WILLIAM HENRY MORGAN, OF ALLIANCE, OHIO.

METAL WHEEL.

Application filed May 5, 1922. Serial No. 558,564.

This invention relates to improvements in metal wheels and more particularly to such as are adaptable for use on self-propelled vehicles employing demountable rims and tires and in which the spokes of the wheel are made of wire,—one object of the invention being to provide, in a two-part wheel structure, simple and efficient wire spoke connections between the hub and one felly member and between the other felly member and a part adjustable on the hub.

With this and other objects in view, the invention consists in certain novel features of construction and combinations of parts as hereinafter set forth and pointed out in the claim.

The accompanying drawing is a sectional view of a two-part wheel showing an embodiment of my invention.

In the drawing, the hub of the wheel is represented at 1 and may be made of cast or forged metal. Near its inner end, the hub 1 is made with integral annular flanges 2 and 3 which may be curved or otherwise made to project in inward and outward directions, respectively,—said flanges being provided with perforations through which lateral shanks 4 at the inner ends of wire spokes 5 and 6 are passed and upset at their inner ends to form retaining heads 7. The spokes 5 and 6 are crossed and extend radially from the hub in outward and inward diagonal directions respectively, to a felly member 8 with which they are connected in a manner hereinafter explained.

An adjusting ring or sleeve 9 is mounted to slide on the hub 1 and is keyed, as indicated at 10, to rotate therewith. The ring or sleeve 9 is made at its respective ends with annular flanges 11, 12, which are provided with perforations for the accommodation of bent shanks 13 at the inner ends of wire spokes 14 and 15 and the spoke shanks 13 are upset at their inner ends to provide retaining heads 16. The spokes 14, 15 are crossed and extend radially to a clamping felly member 17, with which they are connected in the manner presently explained.

Each felly member is made of forged or cast metal and the felly member 8 is formed with an annular flange 18 having an inclined portion 19, while the clamping felly member 17 is made with an inclined portion 20, the free inner edge portion of which underlies the free outer portion of the felly member 8.

The felly member 8 and its flange 18 are provided in their peripheral portions with pockets or recesses 21 in which the heads 22 on elongated nuts 23 are countersunk, said elongated nuts passing through holes in the felly member 8 and through its flange 18, and receiving the threaded outer end portions 24 of the wire spokes 5 and 6. In like manner, the clamping member 17 and its inclined portion 20 are made in their peripheral portions with pockets 25, in which the heads 26 on the outer ends of elongated nuts 27, are counter-sunk, said nuts passing through holes in said clamping felly member and its inclined portion and receive the threaded outer portions 28 at the outer ends of the wire spokes 14 and 15.

It is apparent that a tire rim may be clamped on the felly, between the felly member 8 and the clamping felly member 17 and that the latter is therefore movable relatively to the former. That portion of the wheel of which the clamping felly member forms a part, is firmly held in the position to which it may be adjusted to clamp the tire, by a nut 29 threaded on the hub and having a tapering or wedge portion 30 which enters the ring or sleeve 9 and firmly engages the beveled portion 31 near the outer end of said ring or sleeve. The locking nut 29 is held in position by a cap 32 threaded on the outer end of the hub and serving as a jam nut.

My improvements provide a two-part metal wheel of the wire spoke type, which is strong and substantial in construction, which may be readily adjusted to facilitate the application or removal of a tire, and in which the part of the felly which acts as a movable clamping member for the tire rim is connected with the adjusting member on the hub is connected with the latter through the medium of wire spokes in substantially the same manner in which the main felly member is connected by wire spokes with the hub.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

A metal wheel, comprising two hub members, two felly members, and a plurality of pairs of crossed spokes connecting the respective hub members with the respective felly members, one spoke of each pair being connected with one of the felly members near the inner edge thereof, and the other spokes of the several pairs of spokes being connected with the respective felly members laterally from the connections of the first mentioned spokes with the felly members and near the outer edges thereof.

In testimony whereof, I have signed this specification.

WILLIAM HENRY MORGAN.